United States Patent [19]
Hollon et al.

[11] Patent Number: 5,367,306
[45] Date of Patent: Nov. 22, 1994

[54] GPS INTEGRATED ELT SYSTEM

[76] Inventors: Blake D. Hollon, 1941 Park Dr.; Edmund D. Hollon, 130 Frontier Dr., both of, Douglas, Wyo. 82633

[21] Appl. No.: 72,138

[22] Filed: Jun. 4, 1993

[51] Int. Cl.[5] .......................... G01S 1/08; G01S 5/02
[52] U.S. Cl. .................................... 342/386; 342/357
[58] Field of Search ................ 342/357, 385, 386, 389

[56] References Cited

U.S. PATENT DOCUMENTS

| | | | |
|---|---|---|---|
| 4,547,778 | 10/1985 | Hinkle et al. | 342/456 |
| 4,833,477 | 5/1989 | Tendler | 342/389 |
| 5,144,323 | 9/1992 | Yonkers | 342/386 |
| 5,193,215 | 3/1993 | Olmer | 455/66 |
| 5,218,366 | 6/1993 | Cardamone et al. | 342/385 |

*Primary Examiner*—Gregory C. Issing
*Attorney, Agent, or Firm*—Dean P. Edmundson

[57] ABSTRACT

Method and apparatus are described for the integration of global positioning system (GPS) or LORAN positioning information into the transmission of an emergency locator transmitter (ELT) radio beacon signal. Signals from NAVSTAR satellites or LORAN system are received by a receiver. The calculated position, and then subsequent updates, are processed and alternately stored in two locations on a static random access memory chip. Upon activation of the ELT transmitter, the updated position information, or the latest stored information, is combined with aircraft information stored on an EPROM chip. The aircraft information and position information is preferably converted from a digital-to-speech signal, by a voice synthesizer. All this information is then integrated into the radio beacon signal and broadcast by the ELT. This new ELT-GPS storing and processing package is self-contained, independently powered, and crash resistant. This system avoids loss of time in establishing the location of the beacon signal. A ground use version of the system is also described.

18 Claims, 2 Drawing Sheets

GPS INTEGRATED ELT SYSTEM

FIELD OF THE INVENTION

This invention relates to enhancing the effectiveness of an Emergency Locator Transmitter. More particularly, this invention relates to means for obtaining Global Positioning System (GPS) position information and broadcasting this information over the Emergency Locator Transmitter (ELT) system. In another aspect, this invention provides an apparatus for use in obtaining the GPS position information from any existing GPS unit, storing this information, and then integrating it into the ELT signal. This GPS position information may be synthesized from a digital-to-speech signal, before being integrated into the ELT signal.

BACKGROUND OF THE INVENTION

ELT's presently are primarily used in the location of downed aircraft. When an aircraft goes down, the impact of the crash activates the ELT. ELT's may also be activated manually. The ELT emits a radio signal beacon over the two emergency frequencies (121.5 mHz-civilian and 243.0 mHz-military). These signals are picked up by orbiting satellites, (3-American and 3-Russian) and relayed to Scott Air Force Base in Illinois. This signal beacon gives Scott a general location for a search. Depending on the orbit of the satellite in relation to the signal, the broader the search location may be. Only the satellite in the closest orbit is used to establish a location. The satellite will complete an orbit approximately each 90 minutes. Each orbit will follow a slightly different track and consequently can give a different general location. These differing locations can be as much as 25–35 miles apart.

As an example of this, an aircraft went down in eastern Wyoming. The first location was given to be south of Ayres Natural Bridge (approximately Lat: 42-43-40 Long: 105-36-40). On the next orbit the location had changed to Glendo Lake (approximately Lat: 42-31-20 Long: 105-01-30). Finally on the third orbit, the location was close, by showing Manville (approximately Lat: 42-46-50 Long: 104-36-50). Luckily, the crash was only a forced controlled landing north of the Manville area. Even the close location was not obtained for more than an hour and a half, valuable time lost which the ground team could have used to start an accurate search. If an injury had been involved or if the weather had been bad, this time loss could have been deadly. Even exposure to inclement weather over a given length of time, or to elements of the night, can be deadly to persons stranded.

Commercial airliners also monitor 121.5 mHz, and upon receiving a signal, can give a general location to search personnel. After the general location is established, the nearest search and rescue team (Civil Air Patrol, Sheriff's office, etc.) is notified. In order to come up with an exact location on the signal beacon, these search teams must do a triangulation on the signal. This is done by use of airborne aircraft. Ground vehicles can be used if the terrain permits. The signal needs to be line of site for accurate readings. If the weather is bad, it makes the process of triangulating the signal very difficult or even near impossible. This process can be very time consuming, time that is critical to the survival of the crash victims.

GPS's are distance-based navigational instruments that use satellites to do the triangulation process to arrive at a near exact location. They use a different set of satellites than the ELT's. There are presently (as of Feb. 1993) 22 satellites in orbit. A total constellation of 24 satellites, for a full GPS system, should be fully operational later this year, as published in "AOPAPILOT", Mar. 1993.

The GPS determines its distance from various satellites at known positions, "plots the circles" mathematically, and arrives at a position. By measuring the difference between actual arrival time of the signal and the "timestamp" from the satellite, a distance can be determined. Because the satellites move in space, that distance determines a position on the surface of a sphere with the satellite at the center. By measuring the distance from a second satellite another sphere is determined. This puts us somewhere on the circle where the two spheres intersect. A third satellite measurement produces another "circle of intersection", narrowing down our position to one of two points, just like on the map, while a fourth measurement from yet another satellite resolves the ambiguity and pinpoints your exact position, as published in "EAA's SPORTS AVIATION" February, 1992.

Most of the GPS's presently in use have the capability to track multiple satellites at one time, anywhere from 5 to 8. With the use of this many satellites, GPS's can give a latitude and longitude location with an accuracy of from 15 to, at worst, 100 meters. The Global Positioning System is operated by the U.S. Department of Defense. All GPS systems are subject to accuracy degradation to 100m 2DMS under the Department of Defense imposed Selective Availability program.

Your location is continuously being updated by the GPS system approximately once per second. This information is presented on a LCD display on the GPS unit. GPS's can display a multitude of important information on the LCD display; namely, latitude, longitude and altitude; range, distance and bearing; offset range and bearing from reference waypoint; parallel track and vertical navigation; estimated time of arrival, estimated time en route; ground speed, ground track and desired track; density altitude; true air speed; winds aloft; satellite status; closest point of approach; cross track error; course deviation indicator; sunrise and sunset times; dual timers; and manual and automatic magnetic variation. The aforementioned information is primarily for aircraft navigation and is displayed to the pilot, upon request, with pushbutton operations.

There has not heretofore been provided a method or apparatus for interfacing the positioning information of the GPS system into the radio signal beacon of the ELT. This positioning information may also be integrated into other emergency signal systems in accordance with this invention.

SUMMARY OF THE PRESENT INVENTION

In accordance with the present invention there are provided a method and apparatus for integrating the GPS positioning information into the ELT so as to enhance the effectiveness of the ELT. The positioning information from the GPS is processed by a CPU and stored in a static random access memory chip. It preferably is synthesized to an audible (speech) signal by a voice synthesizer module and broadcast over the ELT in conjunction with the beacon signal. This greatly reduces or eliminates the loss of time in establishing the location of the source of the beacon signal.

Other advantages of the method and apparatus of this invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
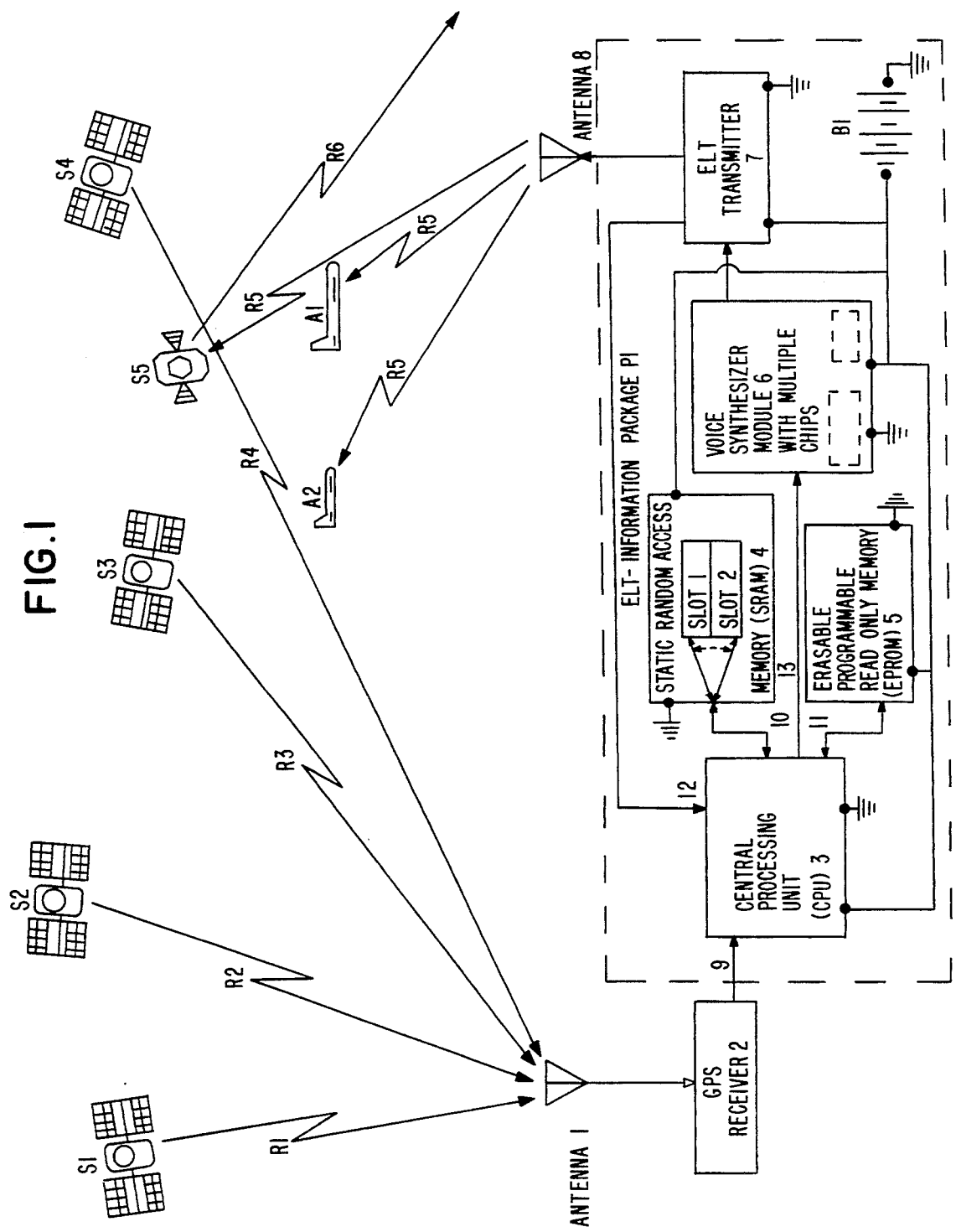
FIG. 1 is a schematic diagram of one embodiment of a GPS integrated ELT system of the invention.

The present invention provides method and apparatus for integrating GPS positioning information into an ELT. The method involves first receiving signals R1, R2, R3, and R4 from four GPS satellites S1, S2, S3, and S4 in the constellation of satellites for the GPS system. These signals are received by antenna 1 connected to GPS receiver 2. GPS receiver 2 may be any existing GPS receiver which is commercially available. GPS receiver 2 will then calculate a position (latitude and longitude) and can project this information on the GPS's display.

When GPS receiver 2 calculates its first position, this digital information is processed by central processing unit (CPU) 3 via interface bus 9. The CPU is commercially available, for example, as Intel 8086 or Motorola M68HC11. CPU 3 then moves this data to a static random access memory (SRAM) chip 4, Slot 1, via bus 10. The SRAM chip is also commercially available, for example, as Sony CXK581000P-12L or Samsung CM681000ALP-10. A position update is calculated approximately every 1-2 seconds on existing GPS receivers. This first position update information is also processed by CPU 3, via interface bus 9. CPU 3 then moves this data to SRAM chip 4, Slot 2. The next position update is then stored in place of the original information in Slot 1. Each following position update information is stored alternately between Slot 1 and Slot 2.

Information stored on SRAM chip 4, Slot 1 or Slot 2, will not be replaced unless the incoming position information from GPS receiver 2 is complete. That is, if the positioning calculation update is interrupted for any reason, this partial information is not processed by CPU 3. This ensures that two complete positions are stored on SRAM chip 4.

It may happen that GPS receiver 2 goes out or the connection between GPS receiver 2 and CPU 3 is broken at the precise moment that an update is being processed by CPU 3. If this happens, the data transfer from CPU 3 to SRAM chip 4 may be interrupted. The information already in memory in the slot to which this information was going to be stored may be destroyed along with the update information. In these situations, one complete position will always remain stored in one slot of SRAM chip 4.

A memory capability with the above-mentioned features is required. In a plane crash, any of the above-mentioned scenarios can and will occur. Consequently, a location position in one of the two memory slots of SRAM chip 4 is required for use with ELT transmitter 7.

Aircraft information, (N-number, pilot name, home base, and home phone number) is in permanent stored memory on erasable programmable read-only memory (EPROM) chip 5. Chip 5 is commercially available, for example, as Intel D27C512 or Texas Instruments 2764. This information can be programmed, and updated, on chip 5 by processing the information on CPU 3 (through an external input source) and then transferring the data to chip 5 via bus 11.

Upon activation of ELT transmitter 7, (either automatically due to a crash impact, or manually by the pilot), CPU 3 is notified via path 12. CPU 3 is programmed to stop storing the update position information from GPS receiver 2 to SRAM chip 4 and to process the incoming position information from GPS receiver 2, in conjunction with the aircraft information from EPROM chip 5, and send all this information to voice synthesizer module 6, via bus 13. Module 6 with multiple chips is commercially available, for example, as Creative Labs CT1336 and CT1351. Voice synthesizer module 6 is able to synthesize the information from a digital-to-speech signal to be broadcast in conjunction with the beacon signal from ELT transmitter 7 over transmission signal R5, via antenna 8. Voice synthesizer module 6 may or may not be used, in which case, bus 13 can be connected directly to ELT transmitter 7. This digital-to-speech conversion will be a user preference feature. The aircraft information, position information, and beacon signal are all sent by ELT transmitter 7, over transmission signal R5, in a repeating format. By this it is meant that the beacon signal is broadcast for a period of, say, 15 seconds or any other desired length of time. This is followed by the aircraft information and then the position information, at which time the procedure is repeated.

GPS receiver 2 may stop sending position information updates to CPU 3, due either to GPS receiver 2 malfunction or disconnection of interface 9, as a result of a crash. If this happens, CPU 3 will process the last stored position information from SRAM chip 4, process this position information in conjunction with the aircraft information from EPROM chip 5, and send all of this information to voice synthesizer module 6, via bus 13. ELT transmitter 7 will then broadcast this last stored position information in the repeating procedure.

CPU 3, SRAM chip 4, voice synthesizer module 6, EPROM chip 5, and ELT transmitter 7, preferably are all placed in a self-contained, protective package P1, with a power source B1 (a battery), independent from the rest of the aircraft. ELT-information package P1 may be portable and can be taken from the aircraft, if necessary.

GPS receiver 2 may also be a portable unit, of which there are presently many such units commercially available, that can remain operational after a crash impact. If a portable GPS receiver 2 is removed from the downed aircraft and re-connected into ELT-information package P1, both units may be taken with the crash victims, if the need arises. So long as GPS receiver 2 is sending updated position information to CPU 3, this information will be broadcast. This will give rescue personnel updates on any movement of the crash victims.

ELT transmitter 7 broadcasts the downed aircraft information, position information, and beacon signal over transmission signal R5. Transmission signal R5 is received by any one of six orbiting satellites S5 which monitor the civilian and military aviation emergency frequencies, 121.5 and 243.0 mHz, respectively. This signal is then broadcast to ground based search and rescue centers, such as Scott Air Force Base, over transmission signal R6. Transmission signal R5 is also received by commercial airliners A1 which monitor the civilian emergency frequency, 121.5 mHz. Transmission signal R5, can also be received by general aviation aircraft A2, private or CAP (Civil Air Patrol), which all have the capability of monitoring the civilian emergency frequency, 121.5 mHz.

Figure 2:
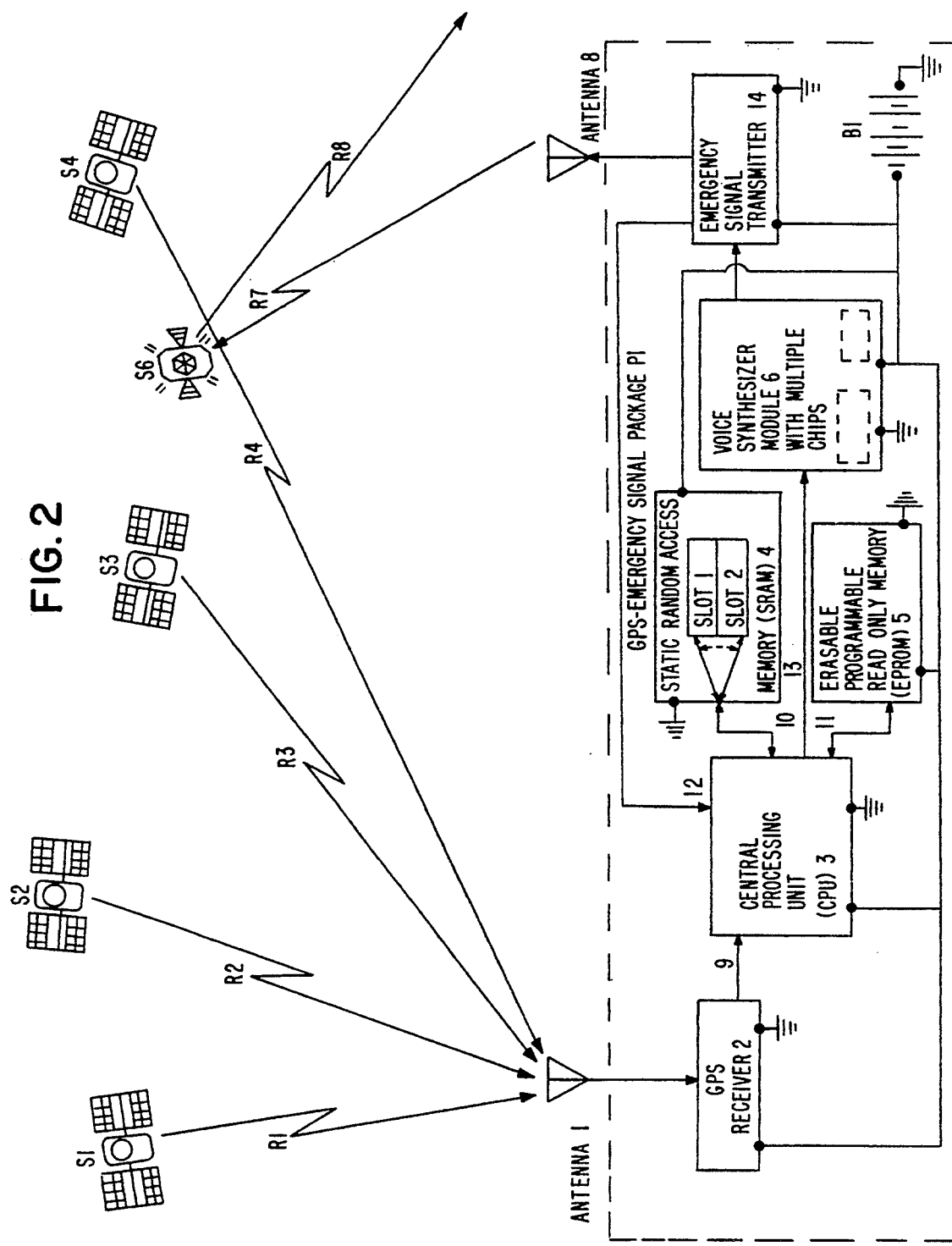
FIG. 2 is a schematic diagram of another embodiment of a GPS integrated ELT system of the invention for ground use emergencies.

A second version of the above apparatus is possible for ground use emergencies. This is illustrated in FIG. 2. The details for this version are the same as the above apparatus, except for the following modifications. The transmitting portion of the unit will be a different ELT because the normal ELT frequencies (121.5 and 243.0 mHz) are designated for aviation use. GPS receiver 2, CPU 3, SRAM chip 4, EPROM chip 5, voice synthesizer module 6, and emergency signal transmitter 14, will all be in a self-contained, waterproof, independently-powered box (e.g., with a battery). Emergency signal transmitter 14 will use frequencies established for transmission of emergency signals via a satellite network. This will include frequencies presently designated for emergency use, or any frequencies assigned at a later date. Transmission signal R7, from the ground use apparatus, is received by emergency signal receiver satellite S6. The signal is then broadcast to an emergency receiver station, over transmission signal R8. The appropriate search and rescue personnel can then be notified.

From reading the present disclosure other modifications will be apparent to persons skilled in the art. Such modifications may involve other features which are already known in the design, manufacture and use of GPS systems and component parts thereof and which may be used instead of or in addition to features already described herein. It is also possible to use position information, latitude and longitude, from land based navigational systems such as Loran (long range navigation) in place of GPS position information from the GPS satellite system. For purposes of this invention, the GPS satellite system and the land based Loran system are considered equivalent for supplying position information to the receiver. It should be understood that the scope of the disclosure of the present application includes any novel feature or any novel combination of features disclosed herein either explicitly or implicitly of any generalization thereof, whether or not it relates to the same invention as presently claimed.

What is claimed is:

1. A method for locating an aircraft in the event said aircraft is downed, the method comprising the steps of:
   (a) providing a GPS receiver on said aircraft for receiving position information, latitude and longitude, from a GPS satellite system;
   (b) providing an ELT information package on said aircraft; wherein said ELT package includes:
      (i) processing means adapted to receive said position information from said satellite system;
      (ii) storage means for storing said position information;
      (iii) transmitting means for transmitting an emergency signal comprising said position information upon activation of said transmitting means;
   (c) providing said storage means with a static random access memory chip adapted to store updated position information from said processing means; and further providing said static random access memory chip with two locations for storing said position information received from said processing means; wherein updated position information is alternately stored in said two locations.

2. A method in accordance with claim 1, further comprising the step of monitoring for said emergency signal.

3. A method in accordance with claim 1, further comprising the step of providing said ELT information package with an EPROM chip including information identifying said aircraft.

4. A method in accordance with claim 3, further comprising the step of providing said ELT information package with voice synthesizer means for converting said information identifying said aircraft to a speech signal.

5. A method in accordance with claim 3, further comprising the step of providing said ELT information package with voice synthesizer means for converting said position information to a speech signal.

6. A method in accordance with claim 1, wherein position information stored in one of said locations is erased only when updated position information is transferred to said location.

7. A method in accordance with claim 3, further comprising the step of providing said ELT information package with voice synthesizer means for:
   (a) converting said position information to a speech signal; and
   (b) converting said information identifying said aircraft to a speech signal.

8. A system for locating a downed aircraft, the system comprising:
   (a) a receiver on said aircraft for receiving position information, latitude and longitude, from a GPS satellite or Loran system;
   (b) an ELT information package on said aircraft comprising:
      (i) processing means for receiving said position information;
      (ii) storage means for storing said position information; wherein said storage means comprises a static random access memory chip adapted to store updated position information from said processing means; wherein said static random access memory chip comprises two locations for storing said position information received from said processing means; wherein updated position information is alternately stored in said two locations;
      (iii) transmitting means for transmitting an emergency signal comprising said position information upon activation of said transmitting means.

9. A system in accordance with claim 8, wherein said ELT information package further comprises an EPROM chip including information identifying said aircraft.

10. A system in accordance with claim 9, wherein said ELT information package comprises voice synthesizer means for converting said information identifying said aircraft to a speech signal.

11. A system in accordance with claim 9, wherein said ELT information package comprises voice synthesizer means for converting said position information to a speech signal.

12. A system in accordance with claim 9, wherein position information stored in one of said locations is erased only when updated position information is transferred to said location.

13. A system in accordance with claim 9, wherein said ELT information package further comprises voice synthesizer means for:
   (a) converting said position information to a speech signal; and
   (b) converting said information identifying said aircraft to a speech signal.

14. Self-contained apparatus comprising:
   (a) processing means for receiving position information from a GPS satellite or Loran system;
   (b) storage means for storing said position information; wherein said storage means comprises a static random access memory chip including two locations for storing position information; wherein updated position information is alternately stored in said two locations;
   (c) EPROM chip for storing identification information;
   (d) transmitting means for transmitting an emergency signal comprising said position information upon activation of said transmitting means;
   (e) battery means for powering said apparatus.

15. Apparatus in accordance with claim 14, further comprising voice synthesizer means for converting said position information to a speech signal.

16. Apparatus in accordance with claim 14, further comprising receiver means for receiving GPS position information from a GPS satellite system.

17. A system for locating a person requiring assistance, the system comprising:
   (a) a receiver to be carried by said person for receiving position information, latitude and longitude, from a GPS satellite or Loran system;
   (b) an ELT information package carried by said person comprising:
      (i) processing means for receiving said position information;
      (ii) storage means for storing said position information; wherein said storage means comprises a static random access memory chip adapted to store updated position information from said processing means; wherein said memory chip comprises two locations for storing said position information; wherein updated position information is alternately stored in said two locations;
      (iii) transmitting means for transmitting an emergency signal comprising said position information upon activation of said transmitting means.

18. A method for locating an aircraft in the event said aircraft is downed, the method comprising the steps of:
   (a) providing a receiver on said aircraft for receiving position information, latitude and longitude, from a broadcasting source;
   (b) providing an ELT information package on said aircraft; wherein said ELT package includes:
      (i) processing means for receiving said position information;
      (ii) storage means for storing said position information; wherein said storage means comprises a static random access memory chip adapted to store updated position information from said processing means; wherein said memory chip comprises two locations for storing said position information; wherein updated position information is alternately stored in said two locations;
      (iii) transmitting means for transmitting an emergency signal comprising said position information upon activation of said transmitting means; and
   (c) monitoring for said emergency signal.

* * * * *